United States Patent Office 3,458,600
Patented July 29, 1969

3,458,600
CHLORAL TREATMENT OF CONJUGATED DIENE BLOCK COPOLYMERS
Roger H. Mann, Newport Beach, Calif., assignor to Shell Oil Company, New York, N.Y., a corporation of Delaware
No Drawing. Filed Jan. 6, 1965, Ser. No. 423,836
Int. Cl. C08d 5/02; C08f 27/02
U.S. Cl. 260—879
2 Claims

ABSTRACT OF THE DISCLOSURE

Block polymers having the general configuration polyisoprene-polybutadiene-polyisoprene are modified to give them self-vulcanizing properties, improved compatibility with polar materials, improved solvent resistance and increased adhesion to metallic or glass surfaces by reacting the block polymer with chloral in the presence of a Friedel-Crafts catalyst.

---

This invention relates to a method for the preparation of block copolymer derivatives. More particularly, it relates to a method for preparing the chloral derivatives of certain conjugated diene block copolymers and to the products so formed.

The preparation of block copolymers of conjugated dienes has received recent attention. A number of types of such block copolymers have been prepared. While these may contain any number of polymer blocks, each block differing from adjacent blocks, certain classes of them appear to be of substantially more commercial interest than others. The types considered are of both thermoplastic elastomeric types and thermoplastic resin types, dependent in part upon the proportions of the several monomers employed, the molecular weights of the total block copolymer and other features.

One of the striking properties of certain of these block copolymers is that they may be processed and formed by molding operations in the same manner as thermoplastic materials but then have the properties of a vulcanized rubber insofar as stress-strain properties are concerned. However, since they have not been actually vulcanized with cross-linking agents such as sulfur and the like, they are still highly sensitive to solution in swelling by many types of organic solvents. While this may not be a limiting feature with respect to numerous end utilities, it nonetheless would be highly desirable to prepare a block copolymer having the self-vulcanizing feature but at the same time having improved solvent resistance.

In many instances, the block polymers being contemplated exhibit another shortcoming which it would be desirable to eliminate or minimize. Since many of them are made of non-polar starting materials, the products are of limited utility when applied to or combined with polar substances. Moreover, they may not adhere strongly to many metallic surfaces when employed as paints, lacquers, films, adhesives, etc. Furthermore, certain of the block copolymers previously prepared have been composed substantially or entirely of conjugated diene polymer blocks and hence are entirely elastomeric and have required vulcanization in order to maximize stress-strain properties. It would be especially desirable to convert this type of block copolymer to a self-vulcanizing product having improved solvent resistance, with improved compatibility with or adhesion to polar materials, metallic surfaces or glass and which at the same time may provide the possibility of further derivatives.

It is an object of the present invention to provide improved block copolymers. It is a particular object of the invention to convert block copolymers substantially or entirely prepared from conjugated dienes to self-vulcanizing elastomers. It is a further object of the invention to enhance the solvent resistance of block copolymers. Other objects will become apparent during the following detailed description of the invention.

Now, in accordance with the present invention, a process is provided for the improvement in physical properties of certain block copolymers which comprises treatment of the block copolymer with chloral whereby polymer blocks of branched chain conjugated dienes (as hereinafter defined) are modified by the addition of chloral. This addition is thought to result in pendant groups on the polymer chain of the formula:

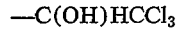

—C(OH)HCCl₃

Still in accordance with the present invention, improved block copolymers are provided having three polymer blocks, each differing from the adjacent polymer block wherein at least one block is a polymer of a branched chain conjugated diene having 5–8 carbon atoms per molecule and having the general configuration

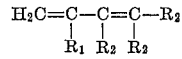

$$H_2C=C-C=C-R_2$$
$$\phantom{H_2C=}\,R_1\ R_2\ R_2$$

wherein $R_1$ is an alkyl radical and each $R_2$ is selected from the group consisting of hydrogen and alkyl, said block being modified by the above-defined chloral substituents in an amount of 10–40 such pendant groups per 100 condensed diene units. At least one other block of the block copolymer is formed of a monomer of the group consisting of vinyl arene and straight chain conjugated dienes having 4–6 carbon atoms per molecule.

The products of the present invention unexpectedly show the set of stress-strain properties characteristic of vulcanized elastomers on the one hand or of improved thermoplastic resins on the other, dependent upon the specific block copolymers receiving the chloral treatment.

The other significant features of the products of the present invention comprise their substantially enhanced resistance to attack by numerous solvents and improvement in their compatibility with an adhesion toward polar, metallic, and glass surfaces.

The block copolymers to be treated with chloral have several alternative basic structures. The most important class of block copolymers to be treated with chloral in accordance with this invention have the general formula

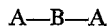

A—B—A wherein each A is a polymer block of a branched chain conjugated diene having 5–8 carbon atoms per molecule and having the general configuration defined hereinbefore, while B is a polymer block of a straight chain conjugated diene having from 4–6 carbon atoms per molecule. The most typical and preferred block copolymer within this class has the structure polyisoprene-polybutadiene-polyisoprene. While the precise molecular weight of the individual polymer blocks does not form an essential and restrictive aspect of this invention, it is preferred for a number of reasons that each of the polymer blocks A have an average molecular weight between about 10,000 and 45,000, while the polymer block B has an average molecular weight between about 35,000 and 150,000. Furthermore, it is preferred that the total weight of the blocks A be less than about 38% of the weight of the entire block copolymer. This class of block copolymer, being composed substantially entirely of blocks made from conjugated dienes, has the properties of an unvulcanized elastomer. Thus, its stress-strain properties are for the most part evident but commercially unsatisfactory. Moreover, it is readily subject to solution or swelling in many types of organic solvents, particularly in hydrocarbons. In order to improve its mechanical properties and solvent resistance, it has heretofore been necessary to subject the polymer to ordinary vulcanizing procedures. While these improved the properties just referred to, it is evident that vulcanizing involves time and expense which it would be desirable to avoid and, moreover, converts the polymer to a form wherein it cannot be readily recovered and reused if such is desired.

Another type of block copolymer which may be treated with chloral in accordance with the present invention has the general configuration

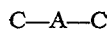
C—A—C wherein each C is a polymer block of a vinyl arene such as styrene. The polymer block A is a block of the branched chain conjugated dienes defined above. Thus, a typical block copolymer within this category has the configuration polystyrene-polyisoprene-polystyrene. It is preferred that the blocks C have an average molecular weight between about 10,000 and 45,000, while the block A, in this case being the center block, should have an average molecular weight between about 35,000 and 150,000. While block copolymers of this latter category have the preferred properties of self-vulcanizing elastomers, otherwise referred to as thermoplastic elastomers, they nonetheless are somewhat deficient in adhesion to polar, metallic, or glass surfaces and moreover are extremely sensitive to damage by organic solvents. Thus, this class may be treated with chloral in accordance with the present invention to improve these shortcomings.

Still further types of block copolymers to be considered in accordance with the present invention have the general configuration

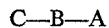
C—B—A wherein each of these polymer blocks is as defined above. A typical block copolymer of this class has the configuration polystyrene-polybutadiene-polyisoprene. Block copolymers of this category will vary from resinous thermoplastics to elastomers depending on the proportion of the vinyl arene polymer block C, but will not have the desired properties of a thermoplastic elastomer since for this purpose two thermoplastic polymer blocks on either end of the block copolymer chains are required. Therefore, the treatment of this type of block copolymer is desired to convert it to a thermoplastic elastomer and at the same time to improve its solvent resistance and adhesion characteristics.

The preparation of the several types of block copolymers to be treated with chloral may proceed through several alternative routes or combinations thereof. Preferably they are prepared by the use of catalysts resulting in "living polymer" which may be by means of a polyfunctional initiator or a monofunctional initiator. The latter type of initiator is preferred since the properties of the block copolymers so obtained are normally better than those obtained with polyfunctional initiators, at least for many purposes. Typical of such initators are lithium alkyls, particularly where the alkyl radical is one having from 2-6 carbon atoms each and preferably one wherein the alkyl radical is of branched configuration. Thus, secondary butyl lithium is the preferred catalyst.

In a typical process involving such a catalyst, the first monomer may be polymerized to form a living polymer block terminated with a lithium radical, after which a second monomer is added and polymerization continued to form an intermediate living block copolymer. Following this, an injection of the first type of monomer or a third type of monomer is made and polymerization continued to form the three-block copolymer. More specifically, styrene may be polymerized with an alkyl lithium catalyst to form a polystyryl lithium block after which a conjugated diene such as isoprene is added and polymerization continued to form the intermediate block copolymer polystyrene-polyisoprenyl lithium, followed by injection of a second portion of styrene to be polymerized and form the eventual three-block copolymer polystyrene-polyisoprene-polystyrene.

In an alternative process employing a difunctional catalyst such as dilithium naphthalene or the like, an initial polymer block of the monomer which will eventually comprise the center block is formed, resulting in a polymer block terminated on both ends with the lithium radical. Thus, butadiene may be polymerized with dilithium naphthalene to form dilithio polybutadiene. Block polymerization is effected by adding to this living polymer block a second monomer such as the branched chain conjugated diene, e.g., isoprene and continuing polymerization to result in the three-block copolymer polyisoprene-polybutadiene-polyisoprene.

Alternatively, the block copolymers to be treated with chloral may be formed by a coupling reaction wherein the polymer chains are coupled by means of difunctional coupling agents. Thus, in accordance with this aspect of the preparation of suitable block copolymers, the polymers containing either terminal alkali metal atoms such as lithium atoms or polymers containing other terminal reactive groups such as sulfhydryl, halogen, sulfonate, hydroxyl, carboxyl, or acid chloride groups are coupled by means of organic polyfunctional coupling agents. The use of such coupling agents permits several alternative procedures dependent upon whether the coupling is performed on only one end of the polymer block chain or on both ends thereof. Suitable coupling agents include glycols, polyhydric phenols, polycarboxylic acids, polyhalohydrocarbons, and the like as well as epoxy compounds, the specific coupling agent being chosen to react with whatever terminal functional radicals exist on the polymer chains being coupled. In a preferred procedure, an intermediate block copolymer having the structure

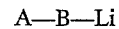
A—B—Li is coupled with a dihalohydrocarbon such as 1,2-dibromoethane, thus resulting in a coupled block copolymer having the general structure

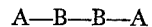
A—B—B—A with lithium bromide being formed as a by-product.

The process of the invention comprises the steps of contacting the block copolymers of the type just described with chloral in the presence of a Friedel-Crafts catalyst. This is preferably effected in the presence of essentially inert solvents for the polymer at temperatures in the order of 0–200° C. preferably between about 50–150° C., for periods of time from about 1 hour to 24 hours. The proportion of chloral utilized will vary with the degree of substitution of the branched conjugated diene units which is desired. Normally this will be between about 0.5 and 5 mols of chloral per condensed branched chain diene unit.

The Friedel-Crafts catalyst employed for this purpose include particularly aluminum chloride, boron trifluoride, tin tetrachloride, uranium chloride, titanium tetrachloride, and aluminum ethoxy chloride among others. Combinations of these materials may be employed. They are preferably present in an amount between about 2% and 15% by weight based on the total block polymers. The conditions are adjusted so as to provide the branched conjugated diene polymer blocks with between about 10 and 40 trichloromethyl hydroxy methyl radicals, per 100 condensed diene units.

Subsequent to reaction with chloral, the polymer derivative may be utilized as such in the cement or may be isolated, such as by coagulation in suitable non-solvents, particularly in hot water or by means of steam. The polymer derivative may be masterbatched with pigments or extenders such as titanium dioxide, carbon black, calcium carbonate, or with fillers known in the art or may be compounded with recipe ingredients for the preparation of adhesives, plastic compositions, surface coatings, latex, paints, and the like. The incorporation of antioxidants, such as phenols or aromatic amines, suppresses crosslinking during storage or processing. Due to the improvement in solvent resistance, the polymer derivatives of the present invention are especially useful for surface coatings where contact with organic solvents may be expected. Moreover, in view of the increased polarity of the derivatives due to the presence of hydroxyl and chloromethyl groups, these products have been found to be surprisingly adherent to polar surfaces and compatible with materials of a polar nature, such as polyurethanes and the like as well as exceptionally adherent to glass for the formation of safety glass or for the formation of laminates with other polymeric materials or with wood as well as metals. The enhanced properties of the polymers of the invention make them especially useful for the formation of laminates of textiles as well as for the impregnation of woven or non-woven textiles as well as the spinning of elastomeric thread.

The reaction of chloral with the type of block polymer represented by polystyrene-polyisoprene-polystyrene results in thermoplastic resins rather than an elastomer. This is due to the fact that the conversion of the center block polyisoprene to the corresponding chloral derivative converts this polymer block from one elastomeric character to one of thermoplastic resin nature. Since the two end blocks of this polymer are already resinous in character, the resulting block copolymer is one especially useful for thermoplastic resin end uses. The products of the invention may be added in any proportion to diene elastomers to improve or alter their properties; may be blended with the original block copolymers to improve their polarity and other properties; may be incorporated in adhesive compositions; and adhere especially well to leather, as in the forming of shoes and shoe components.

The conversion of the type of block copolymer represented by polystyrene-polybutadiene-polyisoprene becomes upon reaction with chloral a thermoplastic elastomer since the conversion of the polyisoprene radical to the chloral derivative thereof converts this polymer block to a type of block which, together with the polystyrene block on the opposite end of the polymer chain results in a thermoplastic elastomer. The following examples illustrate the preparation and properties of the polymers of this invention. The base polymer employed in the first four examples had the general configuration polyisoprene-polybutadiene-polyisoprene. They were all reacted with chloral in cyclohexane solution.

Example I

A 2% solution of such a polymer having block molecular weights of 25,000—82,000—23,000 was heated with 9% by weight based on the polymer of aluminum chloride for about 3 hours at 81° C., the molar ratio of chloral per condensed isoprene unit being 4/1. The resulting chloral derivative of the block polymer had a chlorine content of 14.2% by weight.

The block copolymer prior to chloral treatment had the following physical properties:

Intrinsic viscosity in isopentane at 25° C. _____ 1.48
Yield, p.s.i. _____ 6.2
Tensile strength at break, 70° F. (p.s.i.) _____ 2.0
Elongation at break, percent _____ 210

Example II

A 4% solution of the same block copolymer was heated in the presence of 12% aluminum chloride for about 6 hours at 81° C. utilizing the same molar ratio of chloral as in Example I. The product obtained has the following properties:

Tensile strength at break _____ p.s.i__ 1,630
Modulus at 300% _____ p.s.i__ 242
Elongation at break _____ percent__ 1,190

Example III

The same block copolymer in 2% concentration in cyclohexane was heated with 150% by weight of boron trifluoride-etherate for 90 minutes at 81° C. utilizing the same molar ratio of chloral as in the preceding examples. The resulting polymer contained 3.13% chlorine and had the following properties:

Tensile strength at break _____ p.s.i__ 1,400
Modulus at 300% _____ p.s.i__ 725
Elongation at break _____ percent__ 1,000

Example IV

The block copolymer was heated in 4% concentration in cyclohexane with 12% by weight of aluminum chloride and the same molar ratio of chloral to isoprene unit for 5 hours at 81° C. The product contained about 19% of chlorine, had a tensile strength at break of 1875 p.s.i., a modulus at 300% of 620 p.s.i.; elongation at break of 760%.

The chloral-treated block copolymers of the preceding examples all showed substantially enhanced resistance to swelling in normal heptane and benzene than the corresponding untreated block copolymers which substantially completely dissolved in the solvents.

Example V

A polystyrene-polybutadiene-polyisoprene block copolymer having block molecular weights of 13,000—42,000—20,000 was heated in 4% concentration in cyclohexane with 12% by weight of aluminum chloride and a 4/1 molar ratio of chloral to isoprene unit for two hours at 81° C. The product contained 18.9% by weight of chlorine.

Example VI.—Adhesion of chloral-treated polymers to other surfaces

The adhesive strength of the chloral-treated product of Example I was compared with the untreated product by preparing laminates of canvas with stainless steel and of canvas with polyvinyl chloride, the polymers being used as adhesives.

A composition of 20 parts by weight of the chloral-treated product of Example V with 80 parts by weight of an unmodified block copolymer was likewise tested. The unmodified block copolymer was polystyrene-polybutadiene-polystyrene, having block molecular weights of 14,000–62,000–14,000. Adhesion was tested by peeling at 180° F.

| Sample | Adhesive strength, lb./in. width | |
|---|---|---|
| | Steel | PVC |
| Chloral-treated polymer of Example I | 23 | 22 |
| Unmodified polymer of Example I | 0 | 7 |
| Blend of chloral product of Example VI and unmodified polymer | 16 | 30 |

Where, in the specification, reference is made to molecular weights, the weights are based upon an established intrinsic viscosity-osmotic molecular weight relationship, intrinsic viscosities being determined on a sample withdrawn from the polymerization vessel after the formation of each polymer block is completed. The molecular weights agree closely with tritium counts made on samples withdrawn from the reactor after each polymer block is formed. The samples in the form of the "living" lithium-terminated blocks, were treated with tritiated methanol, coagluated and washed prior to tritium count.

I claim as my invention:
1. A thermoplastic block copolymer having the general configuration

A–B–A wherein each A is a polyisoprene block having an average molecular weight between about 10,000 and 45,000 modified by reaction with chloral, the blocks being modified with 10 to 40 —C(OH)HCCl$_3$ radicals per 100 isoprenoid units, and B is a polybutadiene block having an average molecular weight between about 35,000 and 150,000, the total weight of the blocks A being less than 38% of the weight of the entire block polymer.

2. A copolymer according to claim 1 wherein the blocks A are polyisoprene modified with 15 to 40

—C(OH)HCCl$_3$ radicals per 100 isoprenoid units.

References Cited

UNITED STATES PATENTS

| | | | |
|---|---|---|---|
| 3,251,905 | 5/1966 | Zelenski | 260—879 |
| 3,265,765 | 8/1966 | Holden et al. | 260—879 |

FOREIGN PATENTS 483,815   6/1952   Canada.

OTHER REFERENCES

Pinazzi et al.: Compt. Rend. 256, pp. 2390–2 and 2607–9 (1963).

Deanni et al.: Ind. and Eng. Chem. 38, pp. 1171–1175 (1946).

GEORGE F. LESMES, Primary Examiner

U.S. Cl. X.R.

117—161, 162; 156—333; 161—204, 218, 251, 253, 270; 260—94.7, 859, 876, 880